United States Patent [19]

Robinson et al.

[11] 4,251,654

[45] Feb. 17, 1981

[54] COPOLYETHER GLYCOLS OF TETRAHYDROFURAN AND ALKYLENE OXIDES HAVING LOW OLIGOMERIC CYCLIC ETHER CONTENT

[75] Inventors: Ivan M. Robinson, Wilmington, Del.; Engelbert Pechhold, Chadds Ford, Pa.

[73] Assignee: E. I. Du Pont de Nemours and Company, Wilmington, Del.

[21] Appl. No.: 67,352

[22] Filed: Aug. 14, 1979

Related U.S. Application Data

[63] Continuation-in-part of Ser. No. 887,333, Mar. 16, 1978, abandoned, and Ser. No. 967,082, Dec. 12, 1978, abandoned.

[51] Int. Cl.$^3$ .................. C08G 65/20; C08G 65/30
[52] U.S. Cl. .................................. 528/417; 528/499; 568/617
[58] Field of Search ................ 568/617; 528/417, 499

[56] References Cited

U.S. PATENT DOCUMENTS

| | | | |
|---|---|---|---|
| 2,751,419 | 6/1956 | Hill | 568/617 |
| 3,344,088 | 9/1967 | Miller | 260/2 |
| 3,425,999 | 2/1969 | Axelrood et al. | 260/77.5 |
| 3,478,109 | 11/1969 | McConnell | 260/611 |
| 4,071,492 | 1/1978 | Bethea et al. | 260/31.8 R |

FOREIGN PATENT DOCUMENTS

854958 11/1960 United Kingdom .

OTHER PUBLICATIONS

Hammond et al., "Cationic Copolymerization of Tetrahydrofuran with Epoxides", J. Polymer Science, Part A-1, vol. 9, 281–294, (1971).

Korovina et al., "Formation of a Cyclic Propylene Oxide Tetramer During Copolymerization", Vysokomolekulyarnye Soedineniya (B)17, 597–600, (1975).

Primary Examiner—Earl A. Nielsen

[57] ABSTRACT

Tetrahydrofuran/alkylene oxide polymerizates containing no more than 3%, by weight, of oligomeric cyclic ethers are prepared by extracting the ethers from a raw polymerizate with water.

6 Claims, No Drawings

COPOLYETHER GLYCOLS OF TETRAHYDROFURAN AND ALKYLENE OXIDES HAVING LOW OLIGOMERIC CYCLIC ETHER CONTENT

CROSS-REFERENCE TO RELATED APPLICATIONS

This application is a continuation-in-part of application Ser. No. 887,333, filed Mar. 16, 1978, and application Ser. No. 967,082, filed Dec. 12, 1978, both now abandoned.

DESCRIPTION

1. Technical Field

This invention relates to tetrahydrofuran (THF)/alkylene oxide (AO) polymerizates. It is more particularly directed to such polymerizates containing no more than about 3%, by weight, of oligomeric cyclic ethers. It is further directed to a method for producing such polymerizates, according to which oligomeric cyclic ethers are extracted from a THF/AO polymerizate with water.

2. Background Art

Copolyether glycols based on THF and alkylene oxides are known and have been used in the preparation of polyurethanes. Processes disclosed in the art for producing these copolyether glycols, such as that shown in British Pat. No. 854,958, also produce oligomeric cyclic ether byproducts, which may constitute as much as 7-15%, by weight of the polymerizate. The presence of these oligomeric cyclic ethers in the polymerizate can be undesirable for several reasons. First, the ethers are nonfunctional impurities and can represent an economic penalty to a purchaser of the polymerizate because up to 7-15%, by weight, of the material purchased contains no reactive hydroxyl groups and may therefore be useless for his purposes. Secondly, use of the polymerizate in the preparation of a polyurethane tends to degrade the polyurethane's properties in much the same way as an excess of plasticizer in the polyurethane does. The lower molecular weight oligomeric cyclic ethers vaporize slowly at elevated temperatures and are quite soluble in common organic liquids; the total effect of these physical properties on a polyurethane product is weight loss on exposure to high temperatures or organic solvents, frequently accompanied by undesirable dimensional changes.

The aforementioned British patent discloses, in Examples 1 and 2, that "unreacted monomers and secondary products of low molecular weight which occur to a small degree" can be removed from the polymerizate by distillation in vacuo at temperatures up to 180° C. It has been found, however, that the oligomeric cyclic ether content of the polymerizate cannot be reduced below about 5%, by weight, with such a procedure. At that concentration, the oligomeric cyclic ethers still detract from the polymerizate's usefulness.

The need therefore exists for a THF/AO polymerizate containing a minimum of oligomeric cyclic ethers. This need is filled by the present invention, which provides a THF/AO polymerizate containing no more than about 3%, by weight, of oligomeric cyclic ethers, and in a preferred embodiment, provides a polymerizate containing no more than about 2%. In a highly preferred embodiment of the invention, the polymerizate contains no detectable cyclic ethers.

DISCLOSURE OF THE INVENTION

The raw THF/AO polymerizates from which the polymerizates of the invention are prepared can be produced by known methods of preparing copolyether glycols based on THF and alkylene oxides. Illustrative of such methods are those shown in British Pat. No. 854,958 and in U.S. Pat. No. 4,127,513. The disclosures of those documents are incorporated into this application by reference to show how such polymerizates are prepared.

The raw polymerizates, and the polymerizates of the invention, contain THF/AO copolymers having (1) 10-80%, by weight, of AO units, preferably 20-60%, even more preferably 30-55%;

(2) number average molecular weights of 500-10,000, preferably 650-5000, even more preferably 700-3000; and (3) hydroxyl functionalities of 2.0-4.0, preferably 2.0-2.5.

Number average molecular weight is determined by first determining the hydroxyl number of the copolymer by titration with acetic anhydride according to ASTM-D-1638 and then converting this number to number average molecular weight according to the formula $$\text{Molecular weight} = \frac{56,100 \times n}{\text{hydroxyl number}}$$

where n is the hydroxyl functionality of the copolymer.

"Alkylene oxide" as used herein means an alkylene oxide whose ring contains up to 3 carbon atoms. The AO can be unsubstituted or substituted with, for example, alkyl groups or halogen atoms. Illustrative are ethylene oxide (EO), 1,2-propylene oxide (PO), 1,3-propylene oxide, 1,2-butylene oxide, 1,3-butylene oxide, 2,2-bischloromethyl-1,3-propylene oxide and epichlorohydrin. The preferred polymerizates of the invention are those of THF and EO and THF and PO. The polymerizates of the invention can also be of THF and two or more alkylene oxides, as for example a THF/ethylene oxide/propylene oxide polymerizate.

The oligomeric cyclic ether content of the raw polymerizates can vary with their method of production. The polymerizates usually contain about 7-15%, by weight, of the ethers, and in some cases may contain as much as 15-18%.

"Oligomeric cyclic ether" means a compound having a calculated molecular weight of less than about 500 and containing two or more of the following units linked together in a ring:

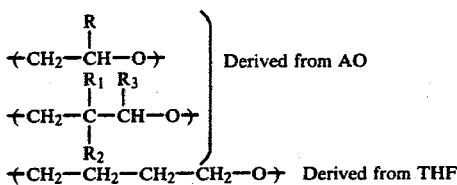

where R, $R_1$, $R_2$ and $R_3$ are hydrogen, methyl, ethyl or halomethyl.

Illustrative of such oligomeric cyclic ethers are those represented in the following table:

| Composition Number | Ratio of AO Units to THF Units | |
| --- | --- | --- |
| 2:1 | | 1:4 |
| 1:2 | | 3:3 |
| 3:1 | | 5:2 |
| 2:2 | | 2:4 |
| 4:1 | | 4:3 |
| 1:3 | | 6:2 |
| 3:2 | | 3:4 |
| 5:1 | | 5:3 |
| 2:3 | | 2:5 |
| 4:2 | | 4:4 |

If the polymerizate is made using an acidic catalyst, it may be desirable to neutralize any catalyst residue in the polymerizate before proceeding with the process of the invention. This neutralization can be accomplished, for example, by adding about 0.5–1%, by weight, of sodium methoxide to the polymerizate.

According to the invention, the oligomeric cyclic ether content of a THF/AO polymerizate is brought to 3%, by weight, or below, by extracting the ethers from the polymerizate with water. This is done by mixing the polymerizate with water and then vigorously agitating the mixture. The temperature at which the extraction is performed is a matter of convenience. In general, the cyclic ethers are more soluble in cold water than in hot, and it is therefore preferred that the extraction be performed at a temperature of about 15°–40° C., even more preferably 15°–30° C.

The amount of water used varies with the water solubility of the cyclic ethers present, but generally enough water is used to provide a water/polymerizate volume ratio of 5–100/1, preferably about 20–60/1.

The water-polymerizate mixture is held at the selected temperature for about 1–3 hours, preferably about 2 hours. Stirring is then stopped, whereupon the organic phase and water phase separate. The organic phase is then drawn off, and the extraction cycle is repeated, if necessary, until the oligomeric cyclic ether content of the polymerizate is brought to the 3% level. The oligomeric cyclic ether concentration can be reduced even below the 3% level; indeed, it can be reduced to below the threshold of detection by repeating the extraction cycle a sufficient number of times.

In an alternative method, the oligomeric cyclic ether content of a polymerizate can be brought to 3% or below by using the well-known principles of continuous countercurrent extraction, at the temperatures previously recommended for sequential extraction.

In another alternative method, the oligomeric cyclic ether content of a polymerizate can be brought to 3% or below by the method described by Gerfried Pruckmayr and Ivan Maxwell Robinson in their U.S. application Ser. No. 962,311, filed on Nov. 27, 1978 (IC 6327 A), according to which the oligomeric cyclic ether content of a THF/AO polymerizate is significantly reduced by bringing it into contact with an ion exchange resin bearing —$SO_3H$ groups. Use of this method not only reduces the oligomeric cyclic ether content of the polymerizate, but also narrows the molecular weight distribution of the copolyether glycol contained in it.

In still another alternative method, the oligomeric cyclic ether content of a polymerizate can be brought to 3% or below by distilling it in wiped-film molecular still, at a temperature of about 95°–250° C. and a pressure of about 13.3–665 Pa (0.1–5 mm of mercury) for about 1–6 hours.

Oligomeric cyclic ether (OCE) content is determined by programmed gas chromatography, using a stainless steel column having a length of 3.049 meters (10 feet) and an outside diameter of 3.175 mm (⅛ inch), packed with 5% by weight of "OV-101", a methyl silicone oil sold by Supelco, Inc., supported on 100–120 U.S.S. mesh "Chromsorb G", sold by Hewlett-Packard, Inc. and which has a glass liner for the injection port, which liner must be replaced frequently to prevent contamination of the port with nonvolatile fractions of sample. The column is in an oven whose temperature is programmed to rise from 70°–300° C. at the rate of 30° C. per minute, with a 12 minute hold time at 300° C. before the cycle is repeated. The instrument may be equipped with an integrator to determine the concentration of unknown in the sample. The determination is conducted under the following conditions:

| | |
| --- | --- |
| Injection port temperature | 280° C. |
| Thermal conductivity detector setting | 320° C. @ 150 milliamperes |
| Carrier gas @ gas flow | Helium @ 30 cubic centimeters per minute |
| Sample size | 10 microliters |
| Internal Standard | Dimethyl ether of triethylene glycol |

The procedure is standardized by first preparing three standard solutions containing, respectively, 2%, 5% and 10% by weight of purified OCE in tetrahydrofuran. A sample of each standard solution is then prepared by measuring into a sample bottle 1.00 gram of the standard solution, 0.10 gram of the dimethyl ether of triethylene glycol and 10 ml of reagent grade toluene, and then shaking the bottle. Duplicates of each sample are injected in turn into the chromatograph, which is then run under the previously mentioned conditions.

The response factor (RF) of the determination is then calculated for each sample according to the equation $$RF = \frac{(\%OCE \text{ in standard})(\text{area \% of internal standard}) \times (\text{weight of standard solution})}{(\text{area \% of OCE})(\text{weight of internal standard})(100)}$$

Average response factor, $RF_a$, is found by averaging the six response factors thus calculated.

The determination of OCE content is carried out by first preparing a sample of THF/AO polymerizate of unknown OCE content by measuring into a sample bottle 1.00 gram of solvent-free polymerizate, 0.10 gram of internal standard and 10 ml of reagent grade toluene, and then shaking the bottle. The sample is then injected into the chromatograph which is then run under the previously mentioned conditions. OCE content is calculated from the results according to the equation $$\text{Weight percent of OCE} = \frac{\text{area \% of OCE}}{\text{area \% of internal standard}} \times 10 \, RF_a$$

Purified OCE is obtained by first distilling a raw THF/AO polymerizate (the AO being the same as that in the copolymer of the unknown) in a 5.08 cm (2-inch) Pope wiped film molecular still, sold by Pope Scientific, Inc., Menomonee Falls, Wis. The distillation is carried out at 170°–190° C. and a pressure of less than about 26

Pa (0.2 mm of mercury), with an input rate of about 1 drop per second.

Two hundred parts by weight of the distillate are mixed with 60 parts by weight of 2,4-toluene diisocyanate and 3 drops of dibutyltin dilaurate and the mixture held at ambient temperature, with stirring, until the exothermic reaction subsides. The mixture is then held at 100° C. for two hours, with stirring, and its free isocyanate content determined by titration with di-n-butylamine, as described in Analytical Chemistry of the Polyurethanes, Volume XVI, Part III, D. J. David and R. B. Staley, Wiley-Interscience, 1969, pages 357–359. Enough ethylene glycol to give an isocyanate/hydroxyl mole ratio of about 1/1 is added to the mixture, which is then brought to 100° C. and held there, for two hours, with stirring, to complete conversion to a polyurethane.

The resulting mixture containing the inert OCE is then extracted with diethyl ether and the extract concentrated on a rotary evaporator at 100° C. and a pressure of about 1333 Pa (10 mm of mercury). The concentrate is then distilled in the Pope molecular still at 170°–190° C. and a pressure of less than about 26 Pa (0.2 mm of mercury) and an input rate of about 1 drop per second. The distillate is purified OCE.

After the OCE content of the raw polymerizate has been reduced to the 3% level or below, the polymerizate is ordinarily brought to about 0.1%, by weight, water content by drying at 80°–160° C. at a pressure of 1.33–26.6 kilopascals (10–200 mm of mercury).

If the original OCE content of the raw polymerizate is high and the number of water extractions which must be performed to reduce the OCE content to 3%, by weight, or below is burdensome, the raw polymerizate can be first distilled to reduce its OCE content to about 5%. This distillation is carried out as previously described. The distillation residue is then extracted with water, also as previously described.

EXAMPLES

In these Examples, all parts are by weight unless indicated otherwise.

EXAMPLE 1 (Best Mode)

One part of a polymerizate containing a THF/EO 80/20 copolymer having a number average molecular weight of 3000 and a hydroxyl functionality of 2.0, and containing 14.4% of OCE was mixed with 50 parts of distilled water in a reaction vessel. The mixture was brought to and held at 26° C., with stirring, for 2 hours. Stirring was then stopped, whereupon the aqueous and organic phases separated. The organic phase was drawn off and dried overnight at 80° C. under a pressure of 26.7 kilopascals (200 mm of mercury). The resulting product had an oligomeric cyclic ether content of 2%.

If desired, the oligomeric cyclic ether content of the product could be reduced to below the threshold of detection by repeating the extraction procedure described above 15 times.

EXAMPLE 2

To a distillation flask were added 133 parts of a polymerizate containing a THF/EO 89/11 copolymer having a hydroxyl functionality of 2.0, and containing 18% of OCE. One part of sodium methoxide was added to the polymerizate, which was then gradually heated to 208° C. over a 4-hour period. A pressure of about 26.7 Pa (0.2 mm of mercury) was maintained on the flask during this period.

At the end of the 4-hour period, the residue was cooled, analyzed and found to contain 4.5% of OCE.

39.7 Parts of this residue were then dissolved in 50 parts (volume) of THF and the solution was extracted 15 times with 200 part portions of water at 20°–25° C., as described in Example 1. The organic phase was then drawn off, dried at 80° C. under a pressure of 26.7 kilopascals (200 mm of mercury) for 6 hours and then analyzed. No oligomeric cyclic ethers were detected. The copolymer in the product had a number average molecular weight of 4290.

EXAMPLE 3

A stainless steel kettle equipped with a stirrer was charged with (1) 2000 parts of Amberlyst® 15 resin, sold by Rohm & Haas Co. and pretreated as described in U.S. application Ser. No. 962,311 (IC 6327 A), and (2) 49,200 parts (volume) of a polymerizate containing a THF/EO 65/35 copolymer having a number average molecular weight of 887, a hydroxyl functionality of 2.0, and also containing 7.5% of oligomeric cyclic ethers, and from which most of the unreacted monomers had been removed by distillation. The mixture was continuously stirred and heated at 100° C. for 4 hours at a pressure of 10 kilopascals (75 mm of mercury).

The mixture was then cooled to ambient temperature and the stirring stopped to allow the resin to settle. The vacuum was broken and the liquid product pumped out from the top of the kettle without disturbing the resin. About 43,500 parts (volume) of THF/EO polymerizate containing 2.4% of oligomeric cyclic ethers were recovered.

INDUSTRIAL APPLICABILITY

The THF/AO polymerizates of the invention can be used in the preparation of polyurethanes according to methods well known in the art. Their low oligomeric cyclic ether content gives the resulting polyurethanes beneficial properties, as previously described.

We claim:

1. A polymerizate containing a copolymer of tetrahydrofuran and ethylene oxide, the copolymer containing 10–80%, by weight, of ethylene oxide and having a number average molecular weight of 500–10,000 and a hydroxyl functionality of 2.0–4.0, the polymerizate containing no more than about 3%, by weight of oligomeric cyclic ethers.

2. The polymerizate of claim 1 containing no more than about 2%, by weight, of oligomeric cyclic ethers.

3. The polymerizate of claim 1 containing no detectable oligomeric cyclic ethers.

4. The polymerizate of claim 1 wherein the copolymer contains 20–60%, by weight, of ethylene oxide, has a number average molecular weight of 650–5000 and a hydroxyl functionality of 2.0–2.5.

5. A method for producing the polymerizate of claim 1, the method comprising extracting oligomeric cyclic ethers from a raw polymerizate with water, until the polymerizate contains no more than about 3%, by weight, of oligomeric cyclic ethers.

6. The method of claim 1, in which, before the water extraction is performed, the raw polymerizate is distilled until its oligomeric cyclic ether content is about 5%, by weight.

* * * * *